United States Patent
Lebron et al.

(10) Patent No.: US 11,077,612 B2
(45) Date of Patent: Aug. 3, 2021

(54) FORMING MICROSTRUCTURES IN 3D PRINTING BY FUSING AND SINTERING USING A FUSING AGENT

(71) Applicant: Hewlett-Packard Development Company, L.P., Houston, TX (US)

(72) Inventors: Hector Lebron, San Diego, CA (US); Jake Wright, San Diego, CA (US); Alexey S. Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 122 days.

(21) Appl. No.: 16/097,822

(22) PCT Filed: Jul. 20, 2016

(86) PCT No.: PCT/US2016/043201
§ 371 (c)(1),
(2) Date: Oct. 30, 2018

(87) PCT Pub. No.: WO2018/017084
PCT Pub. Date: Jan. 25, 2018

(65) Prior Publication Data
US 2019/0134896 A1      May 9, 2019

(51) Int. Cl.
*B29C 64/165*       (2017.01)
*B33Y 10/00*        (2015.01)
(Continued)

(52) U.S. Cl.
CPC .......... *B29C 64/165* (2017.08); *B29C 64/393* (2017.08); *B29C 67/00* (2013.01);
(Continued)

(58) Field of Classification Search
None
See application file for complete search history.

(56) References Cited

U.S. PATENT DOCUMENTS 6,386,699 B1 * 5/2002 Ylitalo .................. B41M 5/508
                                                           347/105
6,589,471 B1 * 7/2003 Khoshnevis ........... B33Y 10/00
                                                           264/497

(Continued)

FOREIGN PATENT DOCUMENTS

JP        2007529340      10/2007
WO     WO-2000/021470      4/2000
(Continued)

OTHER PUBLICATIONS

Brunton et al. ACM Transactions on Graphics, vol. 35, No. 1, Article 4, Publication date: Dec. 2015.*

(Continued)

*Primary Examiner* — Bernard G Lindsay
(74) *Attorney, Agent, or Firm* — Dierker & Kavanaugh PC (57) ABSTRACT

In an example implementation, a method of printing a three-dimensional (3D) object includes, applying a layer of build powder onto a printing platform and depositing a deliberate micropattern of liquid agent onto the powder within a macropattern that defines a cross-section of a 3D object to be printed. The method includes forming a microstructure from the deliberate micropattern by applying fusing energy to the powder, the microstructure comprising fused areas and sintered areas between the fused areas.

15 Claims, 5 Drawing Sheets

(51) Int. Cl.
  *B33Y 50/00* (2015.01)
  *B33Y 80/00* (2015.01)
  *B33Y 30/00* (2015.01)
  *B29C 67/00* (2017.01)
  *B29C 64/393* (2017.01)
  *B33Y 50/02* (2015.01)

(52) U.S. Cl.
  CPC .............. *B33Y 10/00* (2014.12); *B33Y 30/00* (2014.12); *B33Y 50/00* (2014.12); *B33Y 80/00* (2014.12); *B33Y 50/02* (2014.12)

(56) References Cited

U.S. PATENT DOCUMENTS

| | | | |
|---|---|---|---|
| 8,167,999 | B2 | 5/2012 | Alam et al. |
| 9,114,567 | B2 | 8/2015 | Monsheimer et al. |
| 2004/0056378 | A1 | 3/2004 | Bredt et al. |
| 2007/0183918 | A1 | 8/2007 | Monsheimer et al. |
| 2011/0129640 | A1 | 6/2011 | Beall et al. |
| 2011/0222081 | A1 | 9/2011 | Yi et al. |
| 2014/0286813 | A1* | 9/2014 | Guo ....................... B33Y 10/00 419/27 |
| 2015/0201491 | A1* | 7/2015 | Tatsuta .................. H05K 3/125 361/748 |
| 2016/0082666 | A1 | 3/2016 | de Pena et al. |
| 2016/0129501 | A1 | 5/2016 | Loewgren et al. |
| 2016/0243619 | A1* | 8/2016 | Gothait .................. B28B 1/001 |
| 2017/0113412 | A1* | 4/2017 | Adams ................. B29C 64/386 |
| 2017/0173696 | A1* | 6/2017 | Sheinman ............ B22F 3/1017 |
| 2017/0326816 | A1* | 11/2017 | Seepersad ............ B29C 64/165 |

FOREIGN PATENT DOCUMENTS

| | | |
|---|---|---|
| WO | WO-2007114895 | 10/2007 |
| WO | WO 2014110679 | 7/2014 |
| WO | WO 2015108546 | 7/2015 |
| WO | WO-2016053245 | 4/2016 |
| WO | WO 2016053248 | 4/2016 |
| WO | WO-2016080993 | 5/2016 |

OTHER PUBLICATIONS

HP Multi Jet FusionTM technology, A disruptive 3D printing technology for a new era of manufacturing, HP Development Co. L.P. Nov. 2015, 7 pgs.

International Search Report and Written Opinion for International Application No. PCT/US2016/043201, dated Mar. 20, 2017, 12 pages.

Kira, web article, Stunningly Realistic . . . www.3ders.org/articles/20150621-stunningly-realistic-full-color-3d-prints-made-possible-by-fraunhofer-researchers.html, Jun. 21, 2015.

* cited by examiner

FORMING MICROSTRUCTURES IN 3D PRINTING BY FUSING AND SINTERING USING A FUSING AGENT

BACKGROUND

Additive manufacturing processes can produce three-dimensional (3D) objects by providing a layer-by-layer accumulation and unification of material patterned from a digital model. In 3D printing, for example, digitally patterned portions of successive material layers can be joined together by fusing, binding, or solidification through processes including melting, sintering, extrusion, and irradiation. The quality, strength, and functionality of objects produced by such systems can vary depending on the type of additive manufacturing technology used.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

In some examples of three-dimensional (3D) printing, 3D objects can be produced in a 3D printing system (i.e., a 3D printer) by depositing and processing layers of build material, such as layers of powdered nylon, or polyamide. Each layer of build material (i.e., powder) can be deposited and processed on a printing platform within a system work space. The printing platform can be moved vertically downward to increase the height of the work space as additional layers of powder are deposited and processed. Processing can include the selective application of a fusing agent onto layers of the powder in areas where the powder is to be fused together. For example, the fusing agent can be applied to cover a cross-sectional area of a 3D object being printed, according to a 3D digital model. The fusing agent can coat the exterior surface of the powder and penetrate into a layer of powder. Processing can also include exposing the powder to a fusing energy such as visible light radiation and/or infrared (IR) radiation. Fusing agent deposited onto the powder can absorb the radiation and convert it into thermal energy. The thermal energy can fuse (i.e., melt and coalesce) those areas of the powder to which the fusing agent has been applied. This process can be repeated with each layer of powder deposited into the work space until each cross-sectional area is fused together to form a 3D object.

In some examples, colored objects can be generated by such additive 3D printing processes. The quality of color produced on 3D objects, such as the color brightness and vibrancy, can depend in part on the degree of whiteness of the object. The whiter an object can be made, the brighter and more vibrant the colors applied to the object will appear to an observer. Accordingly, in some examples producing colored objects can include adding brightening agents during printing that enable the finished object to scatter light more effectively. This can be done, for example, by mixing a light-scattering material such as TiO2 into the powder, or by mixing the light-scattering material with a fusing agent or an ink and jetting it onto the powder. While light-scattering agents can help to produce whiter objects, they can sometimes have a negative impact on the mechanical properties of the object when they've been dispersed throughout the material within the object (e.g., plastic material). In addition, dispensing the light-scattering agent within a fusing agent or ink can result in an increased water load that inhibits the fusing of the object.

In some examples, producing whiter 3D objects can involve sintering the objects instead of fully fusing the objects. As used herein, sintering refers to a process that binds together particles such as particles of powdered build material, through the application of heat and/or pressure, without fully melting the particles. By contrast, as used herein, fusing refers to a process whereby such powdered particles are fully melted and then solidified. In some examples, sintering can be achieved by depositing lesser amounts of fusing agent or a diluted fusing agent onto the powder before applying a lowered fusing energy. A sintered region can be a thin shell that surrounds a fused core of an object, or a sintered region can penetrate deeper into an object, extending through numerous layers within the object.

Because sintered (i.e., unmelted) particles have improved light scattering effect, sintering an object can help create a homogenous and whitish appearance across the object. While sintering can help create whiter objects, however, variations in the sintering process, such as variations in the application of fusing energy and/or fusing agents, can sometimes lead to inconsistent results that reduce the quality of the 3D objects. For example, in some cases an inadvertent increase in the amount of fusing energy during sintering can fully melt (i.e., fuse) particles, causing the resulting object to become dark in color due to a degradation in the light scattering effect. Conversely, decreases in the amount of fusing energy can result in poorly connected particles which can cause the mechanical structure of the object to become too weak to survive the expected handling or use of the object.

Accordingly, in some examples described herein, printing a 3D object can include forming deliberate 3D microstructures across the surface of the object to deliver a uniform and improved surface color without trading off gamut for particle melting or significantly impacting mechanical strength. Depositing a fusing agent onto powdered build material (e.g., powdered polymer) in deliberate micropatterns and providing a subsequent fusing event can create consistent, strongly fused, and deliberate microstructures while simultaneously creating deliberate regions of sintered particles within the gaps of the microstructure. The areas of sintered particles within the gaps of the fused microstructure increase the light scattered back to an observer which causes objects to appear whiter and brighter. The fused microstructures help to capture and hold sintered powder and colorants within the microstructure gaps which causes the object colors to appear brighter and more vibrant against the white background of the sintered particles.

In some examples, such 3D microstructures can also be formed and distributed within a 3D object as the object is being printed so that the microstructures are present on multiple internal layers of the object. In addition to improving the color performance of an object, the microstructures formed within the object provide robust mechanical strength and performance for the object. For example, forming microstructures throughout a number of internal layers of an object can provide significant color improvement inside the object and on the outer surfaces of the object, as well as creating a high degree of mechanical strength in the object. Forming microstructures on a number of the outer layers of an object in conjunction with forming a fully fused/melted object core, can result in an object that has the mechanical strength of a fully fused object as well as improved color performance.

As used herein, the term 'micropattern' is intended to refer to a small pattern created within a larger macropattern. The term 'macropattern' is intended to refer to a larger pattern that defines or circumscribes a cross-sectional slice of a 3D object being printed. A micropattern can be created by depositing a liquid fusing agent onto powdered build material within the perimeter of a macropattern. The macropatterns, or cross-sectional slices of 3D objects that are being printed, are derived from 3D object model data that represents the 3D objects to be printed.

In a particular example, a method of printing a three-dimensional (3D) object includes receiving object data that represents a model of a 3D object, and modifying the object data to generate patterned object data. The patterned object data represents a 3D object model that includes a micropattern. Using the patterned object data, print data is generated to control a 3D printer to deposit a liquid fusing agent onto a layer of build material within a macropattern that comprises a cross-section of a 3D object being printed. Depositing the liquid fusing agent forms a micropattern of agent areas that have liquid fusing agent, and gap areas that lack liquid fusing agent. The method includes forming a 3D microstructure by applying infrared radiation to simultaneously fuse the agent areas while sintering the gap areas.

In another example, a non-transitory machine-readable storage medium stores instructions that when executed by a processor of a three-dimensional (3D) printer cause the 3D printer to deposit a powder layer onto a printing platform, and to form on the powder layer, a micropattern comprising fusible areas on which fusing agent is deposited separated by sinterable areas in between the fusible areas on which fusing agent is not deposited. The 3D printer exposes the powder layer to infrared radiation to simultaneously fuse the fusible areas and sinter the sinterable areas into a microstructure.

In another example, a method of printing a 3D object includes applying a layer of build powder onto a printing platform, and depositing a micropattern of liquid agent onto the powder within a macropattern that defines a cross-section of a 3D object to be printed. The method includes forming a microstructure from the micropattern by applying fusing energy to the powder. The microstructure includes fused areas and sintered areas between the fused areas.

Figure 1:
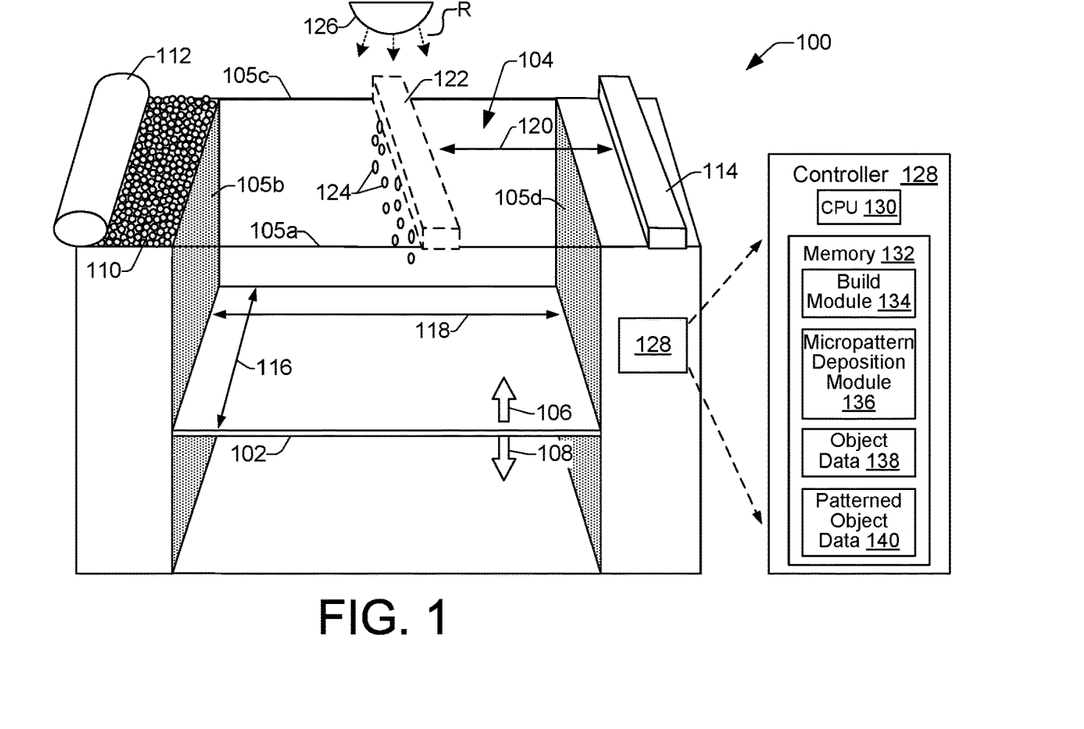
FIG. 1 shows a perspective view of an example three-dimensional (3D) printing system suitable for forming 3D microstructures when printing 3D objects.

FIG. 1 shows a perspective view of an example three-dimensional (3D) printing system 100 suitable for forming 3D microstructures when printing 3D objects according to examples described herein. The example printing system 100 includes a moveable printing platform 102, or build platform 102 that can serve as a floor to a work space 104 in which a 3D object (not shown in FIG. 1) can be printed. The work space 104 can include fixed walls 105 (illustrated as front wall 105a, side wall 105b, back wall 105c, side wall 105d) around the printing platform 102. The fixed walls 105 and platform 102 can contain a volume of powdered build material deposited layer by layer into the work space 104 during printing of a 3D object. For purposes of this description and to help illustrate different elements and functions of the 3D printing system 100, the front wall 105a of the work space 104 is shown as being transparent. During printing, a build volume within the work space 104 can include all or part of a 3D object formed by powder processed with fusing agent and fusing energy (e.g., radiation) have been applied. The build volume can also include non-processed powder that surrounds and supports the 3D object within the work space 104.

The printing platform 102 is moveable within the work space 104 in an upward and downward direction as indicated by up arrow 106 and down arrow 108, respectively. When printing of a 3D object begins, the printing platform 102 can be located in an upward position toward the top of the work space 104 as a first layer of powdered build material is deposited onto the platform 102 and processed. After a first layer of powder has been processed, the platform 102 can move in a downward direction 108 as additional layers of powdered build material are deposited onto the platform 102 and processed.

The example 3D printing system 100 includes a supply of powdered build material 110, or powder. The build material, alternately referred to herein as "powder", can comprise powdered material made from various materials that are suitable for producing 3D objects. Such powdered materials can include, for example, polymers, glass, ceramics (e.g., alumina, $Al_2O_3$), Hydroxyapatite, metals, and so on. The printing system 100 can feed powder from the supply 110 into the work space 104 using a spreader 112 to controllably spread the powder into layers over the printing platform 102, and/or over other previously deposited layers of powder. A spreader 112 can include, for example, a roller, a blade, or another type of material spreading device.

The example 3D printing system 100 also includes a liquid agent dispenser 114. While other types of liquid dispensers are possible, the example dispenser 114 shown and described herein comprises a printhead 114 or printheads, such as thermal inkjet or piezoelectric inkjet printheads. The example printhead 114 comprises a drop-on-demand printhead having an array of liquid ejection nozzles suitable to selectively deliver a fusing agent or other liquid onto a layer of powder that has been spread onto the printing platform 102. In some examples, the printhead 114 has a length dimension that enables it to span the depth 116 of the work space 104. Thus, the printhead 114 can scan over the width 118 of the work space 104 in a page-wide array configuration as it applies droplets of a fusing agent, colorant, or other liquid onto layers of powder within the work space 104.

FIG. 1 shows an example scanning motion (illustrated by direction arrow 120) of the printhead 114. The scanning printhead is illustrated by a dashed-line printhead representation 122 that is shown scanning across the work space 104 while ejecting liquid droplets 124 onto a layer of powder (not shown) in the work space 104. Although not shown in the example of FIG. 1, during printing a portion of a 3D object would be present within the work space 104 as the printhead 114 scans over the work space and ejects droplets 124 of a fusing agent or other liquid.

Examples of fusing agents suitable for ejection from printhead 114 include water-based dispersions comprising a radiation absorbing agent. The radiation absorbing agent can be an infrared (IR) radiation absorber, a near infrared radiation absorber, or a visible light absorber. In some examples, a fusing agent can be an ink-type formulation including carbon black as the radiation absorbing agent. In some examples, a fusing agent can be an ink or other liquid that absorbs energy in the IR spectrum but reflects energy in the visible light spectrum. Dye based and pigment based colored inks are examples of inks that include visible light absorbing agent.

As shown in FIG. 1, the example 3D printing system 100 also includes a fusing energy source such as radiation source 126. The radiation source 126 can be implemented in a variety of ways including, for example, as a curing lamp or as light emitting diodes (LEDs) to emit IR, near-IR, UV, or visible light, or as lasers with specific wavelengths. The radiation source 126 can depend in part on the type of fusing agent and/or powder being used in the printing process. The radiation source 126 can be attached to a carriage (not shown) and can be stationary or scanned across the work space 104. The radiation source 126 can apply radiation R to layers of powder in the work space 104 to facilitate the heating and fusing of the powder. In some examples, a fusing agent 124 can be selectively applied by printhead 114 to a layer of powder to enhance the absorption of the radiation R and help convert the absorbed radiation into thermal energy. In areas where fusing agent has been applied to the powder, the absorbed radiation can heat the powder sufficiently to cause fusing of the powder. As discussed in more detail below, in areas where fusing agent has not been applied to the powder, heat dispersion from fused areas can cause the powder to sinter.

The example 3D printing system 100 additionally includes an example controller 128. The controller 128 can control various operations of the printing system 100 to facilitate the printing of 3D objects as generally described above, such as spreading powder into the work space 104, selectively applying fusing agent 124 to portions of the powder, and exposing the powder to radiation R. In addition, as described in more detail below the controller 128 can control the 3D printing system 100 to form microstructures on surfaces of 3D objects, and internally within 3D objects, to provide improved control over the color and functional performance of the objects.

As shown in FIG. 1, an example controller 128 can include a processor (CPU) 130 and a memory 132. The controller 128 may additionally include other electronics (not shown) for communicating with and controlling various components of the 3D printing system 100. Such other electronics can include, for example, discrete electronic components and/or an ASIC (application specific integrated circuit). Memory 132 can include both volatile (i.e., RAM) and nonvolatile memory components (e.g., ROM, hard disk, optical disc, CD-ROM, magnetic tape, flash memory, etc.). The components of memory 132 comprise non-transitory, machine-readable (e.g., computer/processor-readable) media that can provide for the storage of machine-readable coded program instructions, data structures, program instruction modules, JDF (job definition format), and other data and/or instructions executable by a processor 130 of the 3D printing system 100.

An example of executable instructions to be stored in memory 132 include instructions associated with a build module 134 and a micropattern deposition module 136, while examples of stored data can include object data 138 and patterned object data 140. In general, modules 134 and 136 include programming instructions executable by processor 130 to cause the 3D printing system 100 to perform operations related to printing 3D objects within a work space 104, including printing 3D objects comprising variously patterned 3D microstructures across the surface layers of objects and on internal layers of objects to help deliver improved color and mechanical performance. Such operations can include, for example, the operations of methods 500, 600, and 700, described below with respect to FIGS. 5, 6, and 7, respectively.

In some examples, controller 128 can receive object data 138 from a host system such as a computer. Object data 138 can represent, for example, object files defining 3D object models to be produced on the 3D printing system 100. Object data 138 can include information regarding strength and color characteristics of a 3D object that can be used to determine when and how to incorporate microstructures into the object, as described below. Executing instructions from the build module 134, the processor 130 can generate print data for each cross-sectional slice of a 3D object model from the object data 138. The print data can define, for example, each cross-sectional slice of a 3D object model, the liquid agents to be used to cover the build powder within each cross-sectional slice, and how fusing energy is to be applied to fuse each layer of powder. The processor 130 can use the print data to control components of the printing system 100 to process each layer of powder. Thus, the object data can be used to generate commands and/or command parameters for controlling the distribution of build powder from a supply 110 onto the printing platform 102 by a spreader 112, the application of fusing agents by a printhead 114 onto layers of the powder, the application of radiation by a radiation source 126 to the layers of powder, and so on.

A micropattern deposition module 136 includes further executable instructions to enable a processor 130 of 3D printing system 100 to modify object data 138. The instructions can cause the processor to make determinations on whether and how to modify object data 138 with micropatterns based on, for example, color and strength characteristics that are defined within the object data. For example, an object defined to have greater strength may be modified with micropatterns on its outer surface, but not on internal layers, in order to provide modest color performance but to ensure that the core of the object is fully fused throughout. An object defined to have higher color performance may be modified so that both outer and inner layers of the object are modified with micropatterns. Similarly, color and strength characteristics that are defined within the object data 138 can cause determinations regarding the types of micropatterns used to modify object data 138. For example, as noted below, the density of micropatterns and the thickness of the micropattern features can be used to better control the color and strength of 3D objects. Object data 138 calling for an object with greater strength may cause a modification that includes dense micropatterns having thicker features packed close together to provide greater strength performance. Similarly, object data 138 calling for an object with greater color performance may cause a modification that includes less dense micropatterns having thin features that are spaced farther apart. Thus, instructions from module 136 are executable to control modifying a 3D object model from the object data 138 to create patterned object data 140. The patterned object data 140 can further define a 3D object model to include micropatterns to be printed within larger macropatterns that define cross-sectional slices of the 3D object model, as noted above. The processor 130 can use print data generated from the patterned object data 140 to control the printing system 100 to print micropatterns and form microstructures on surface layers and internal layers of a 3D object.

Figure 2:
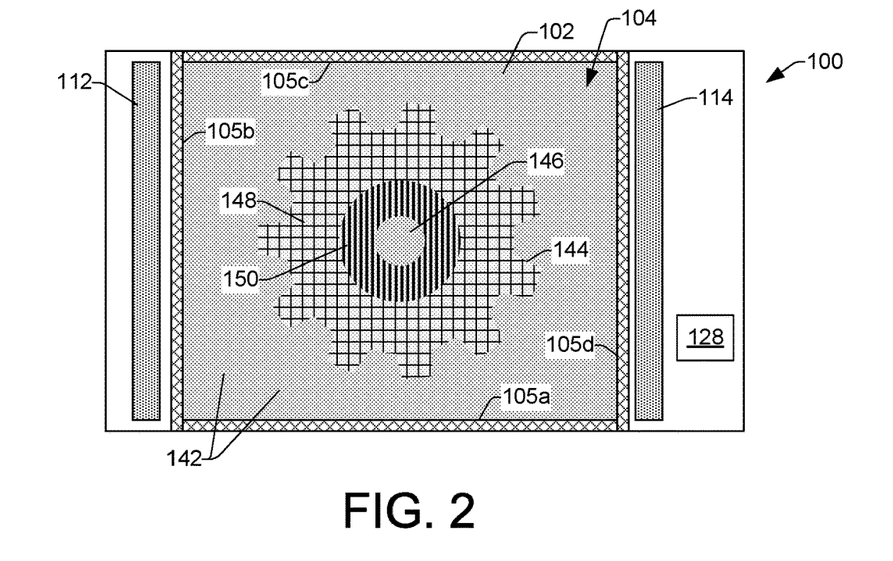
FIG. 2 shows a top down view of an example three-dimensional (3D) printing system in which a 3D object is being printed.

FIG. 2 shows a top down view of an example three-dimensional (3D) printing system 100 in which a 3D object is being printed. As shown in FIG. 2, a layer of build powder 142 has been deposited onto the printing platform 102 within the work space 104 of the system 100. The layer of powder 142 can be a layer that is to form an outside surface layer of a 3D object or an internal layer of the 3D object. A macropattern 144 formed on the layer of powder 142 defines a cross-sectional slice of the 3D object being printed. In the example of FIG. 2, the macropattern 144 appears to be in the shape of a sprocket wheel having a circular hole 146 at its center. Within the macropattern 144 and delineating the macropattern 144, are two example micropatterns (illustrated as a first micropattern 148 and a second micropattern 150) that have been formed by the deposition of a liquid agent onto the layer of powder 142. In some examples, a single micropattern can be formed within a macropattern 144, while in other examples multiple micropatterns can be formed within the macropattern 144. Upon fusing, different micropatterns can result in microstructures that provide varying color and mechanical strength characteristics within a 3D object. Accordingly, the use of different micropatterns within macropatterns 144 (i.e., cross-sectional slices) on layers throughout a 3D object can create a 3D object with diverse color and mechanical characteristics. Referring to FIG. 2, for example, a first micropattern 148 formed within macropattern 144 may result in microstructures that have strong color performance and moderate strength, while a second micropattern 150 results in microstructures that have moderate color performance and high strength.

Figure 3:
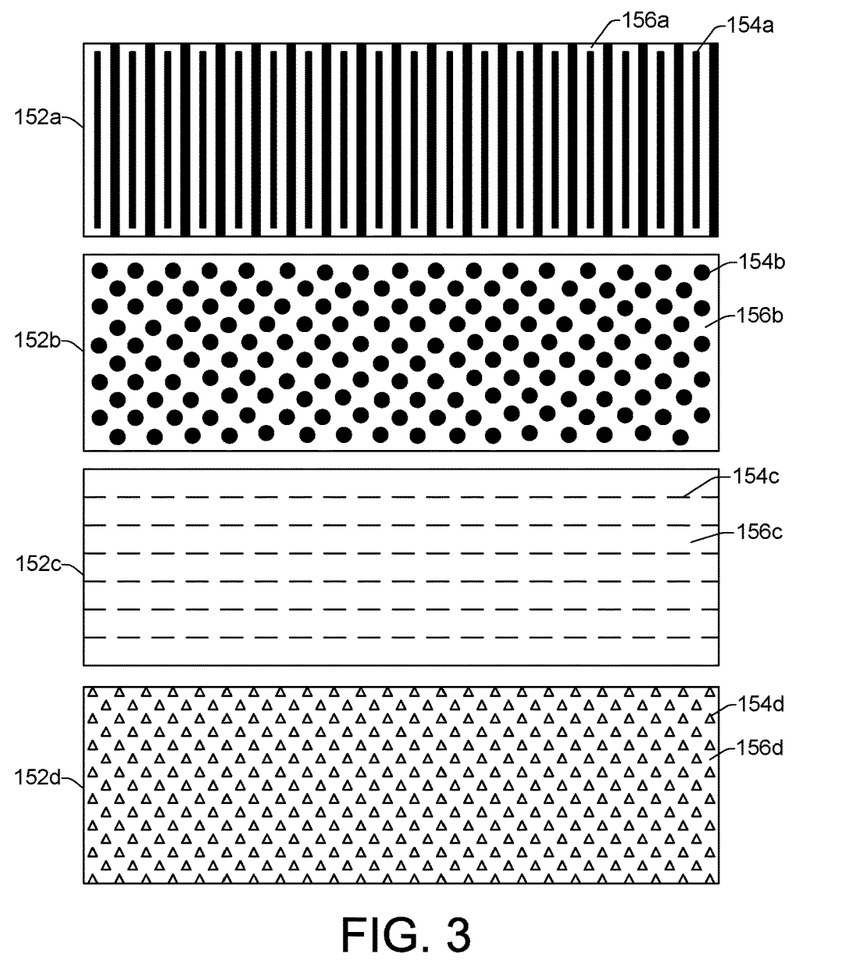
FIG. 3 shows a number of example micropatterns suitable for use in a 3D printing system to create microstructures on a 3D object.
Figure 4:
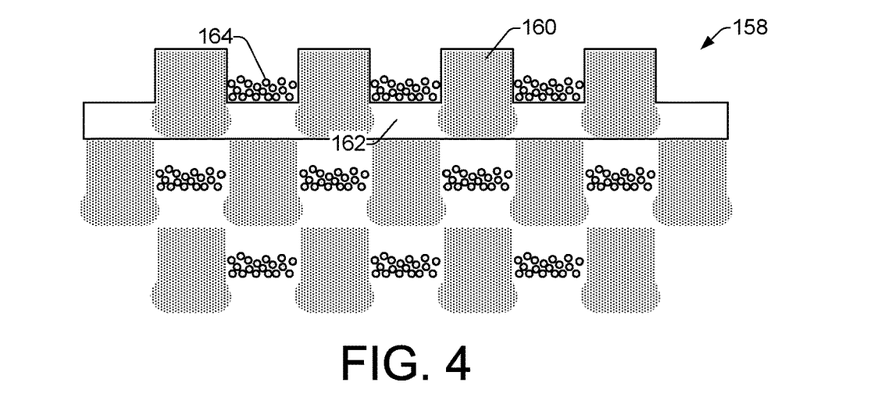
FIG. 4 shows an example of a microstructure that may result from applying fusing energy to a micropattern such as the line micropattern 152a, of FIG. 3.

FIG. 3 shows a number of example micropatterns 152 (illustrated as micropatterns 152a, 152b, 152c, and 152d) that may be suitable for use in a 3D printing system 100 to create microstructures on a 3D object. The micropatterns 152 shown in FIG. 3 are intended as examples, and are not intended to indicate any limitations as to other micropatterns that may be suitable for use within a 3D printing system 100. Suitable micropatterns can include a variety of geometric patterns including different lattice-type patterns based on lines, dots, squares, triangles, and other geometries. In such lattice patterns, the geometric features such as the lines or dots are to be regularly spaced throughout the pattern. In some examples, micropatterns can be interlaced between layers of an object to create microstructures that are interlaced between layers of the object, as shown in FIG. 4.

A micropattern can be formed by controllably depositing liquid fusing agent onto a layer of build powder. With respect to the micropatterns 152 shown in FIG. 3 and the micropatterns 148 and 150 shown in FIG. 2, the liquid fusing agent is represented as the darkened geometric features such as the lines 154 or macro dots 156 (i.e., multiple pixels of liquid agent). Thus, micropatterns 152 comprise agent areas 154 (illustrated as agent areas 154a, 154b, 154c, 154d) that have liquid fusing agent deposited thereon, and gap areas 156 (illustrated as gap areas 156a, 156b, 156c, 156d) that lack liquid fusing agent. The application of fusing energy to a micropattern can form a microstructure that includes fused agent areas and sintered gap areas. FIG. 4 shows an example cross-section of a microstructure 158 that may result from applying fusing energy to a micropattern such as the line micropattern 152a of FIG. 3. The microstructure 158 has been formed on several layers illustrated as layer n, layer n+1, and layer n+2. In this example, layer n+2 can represent the surface layer of an object, while layer n and layer n+1 can represent layers underlying the surface layer. As noted above, the microstructure 158 comprises a structure that is interlaced between the layers of an object. The fused regions 160 of the microstructure 158 are formed where the agent areas generate enough heat to create a solidly fused surface, while the sintered regions 162 are formed in the gap areas from indirect heat that disperses into the gap areas from the agent areas. The fused regions 160 of the microstructure help to capture and hold sintered powder and colorants 164 within the gap areas 162.

In general, forming deliberate micropatterns enables control over the creation of microstructures that include fused regions and sintered regions on the surface and/or inner layers of a 3D object. Controlling the size and distribution of fused and sintered regions on the surface and other layers of a 3D object enables a wider process window for controlling the color and strength of objects. For example, creating dense micropatterns with thicker features such as thicker lines or dots that are packed close together can provide greater strength performance with less color performance due to the greater area of fused region that will result. Conversely, less dense micropatterns having thin features that are spaced farther apart can provide better color performance with less strength performance due to the decreased area of fused regions that will result. Referring to FIG. 3, the example micropattern 152a comprises a line pattern in which a fusing agent is deposited in lines that are separated by gaps that have no liquid agent. The thickness of the lines, the density of the fusing agent applied to the lines, and the size of the gaps between the lines can effect whether enough heat will be generated in a fusing event to create solidly fused areas and sintered areas in the gaps. In some examples, lines can have a thickness between $1/1200"$ (0.0211667 mm) and $3/1200"$ (0.0635 mm), and be separated by gaps that have a thickness of between $5/1200"$ (0.105833 mm) and $12/1200"$ (0.254 mm) in which sintered powder is formed. Similarly, in a dot micropattern such as micropattern 152b in FIG. 3, macro dots can have a size of between $5/1200"$ (0.105833 mm) and $8/1200"$ (0.169333 mm), and can be equilaterally spaced within gaps that can range from $8/1200"$ (0.169333 mm) to $16/1200"$ (0.338667 mm). While some example sizes for micropattern feature sizes (i.e., sizes for lines and dots) and gaps in between the features have been provided, other sizes and dimensions are possible and are contemplated herein.

Figure 5:
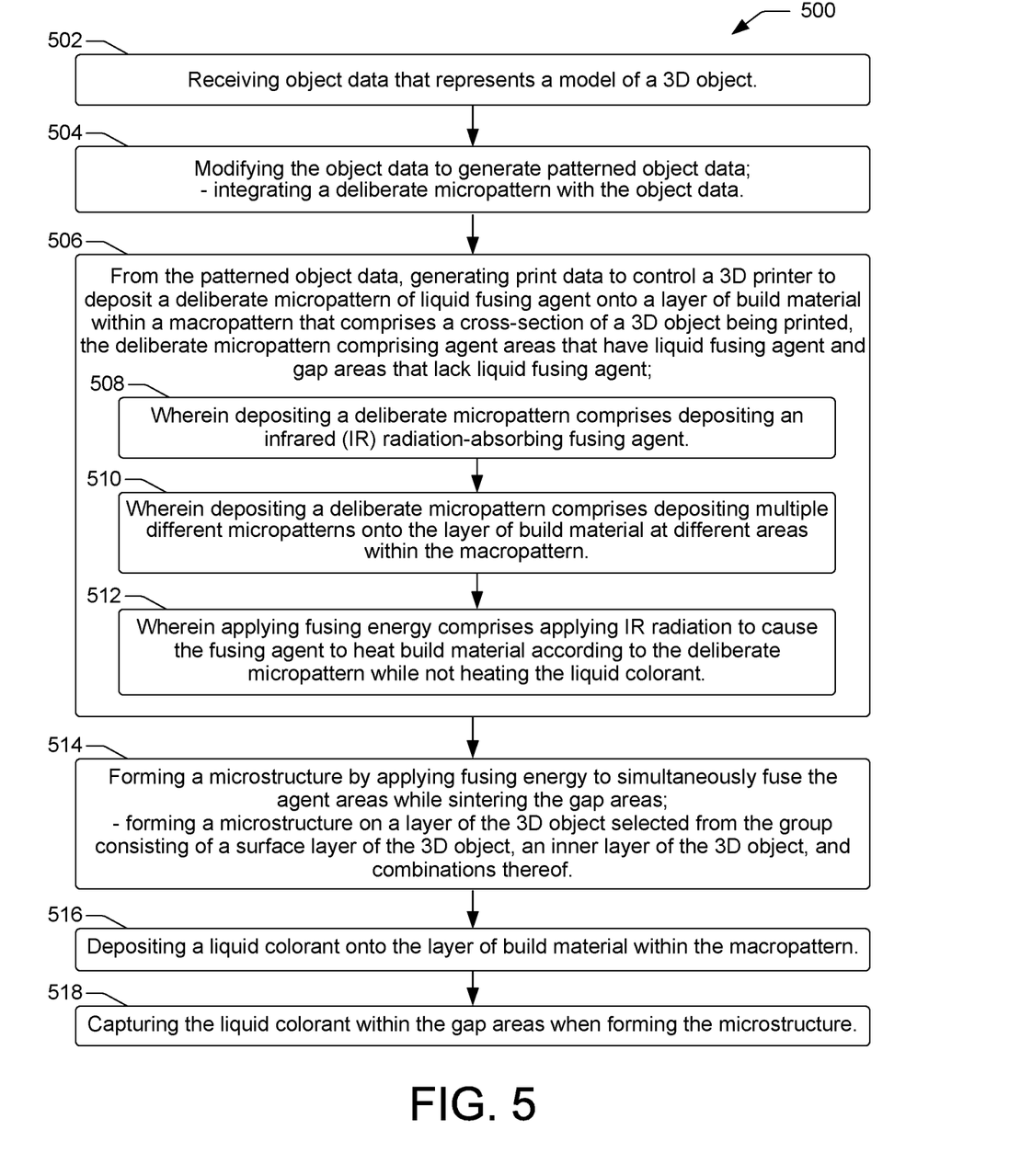
FIGS. 5, 6, and 7, are flow diagrams showing example methods of printing a three-dimensional (3D) object.
Figure 6:
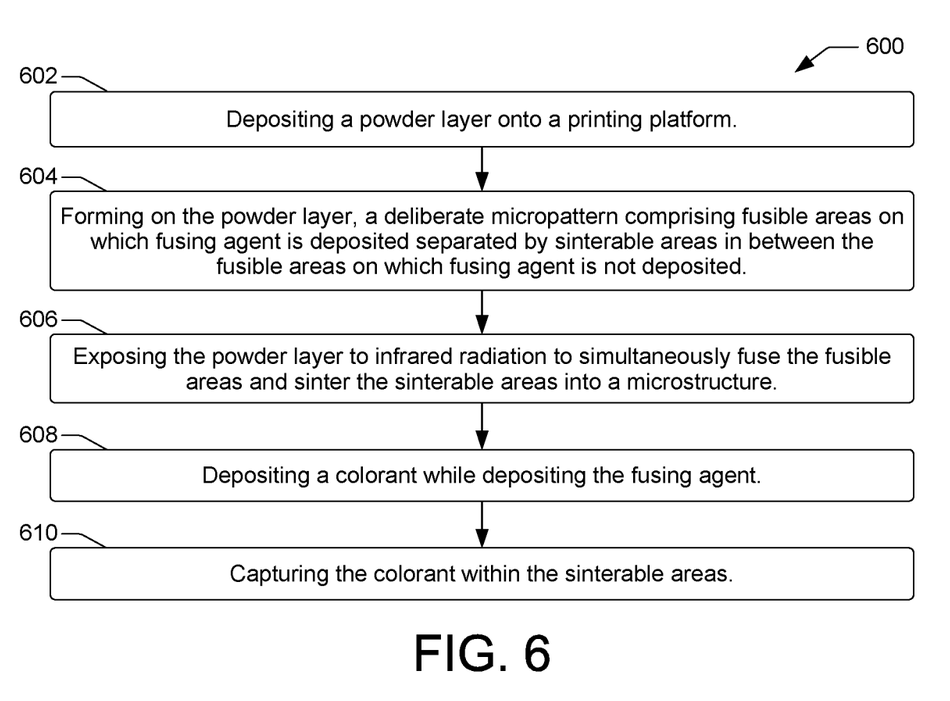
Figure 7:
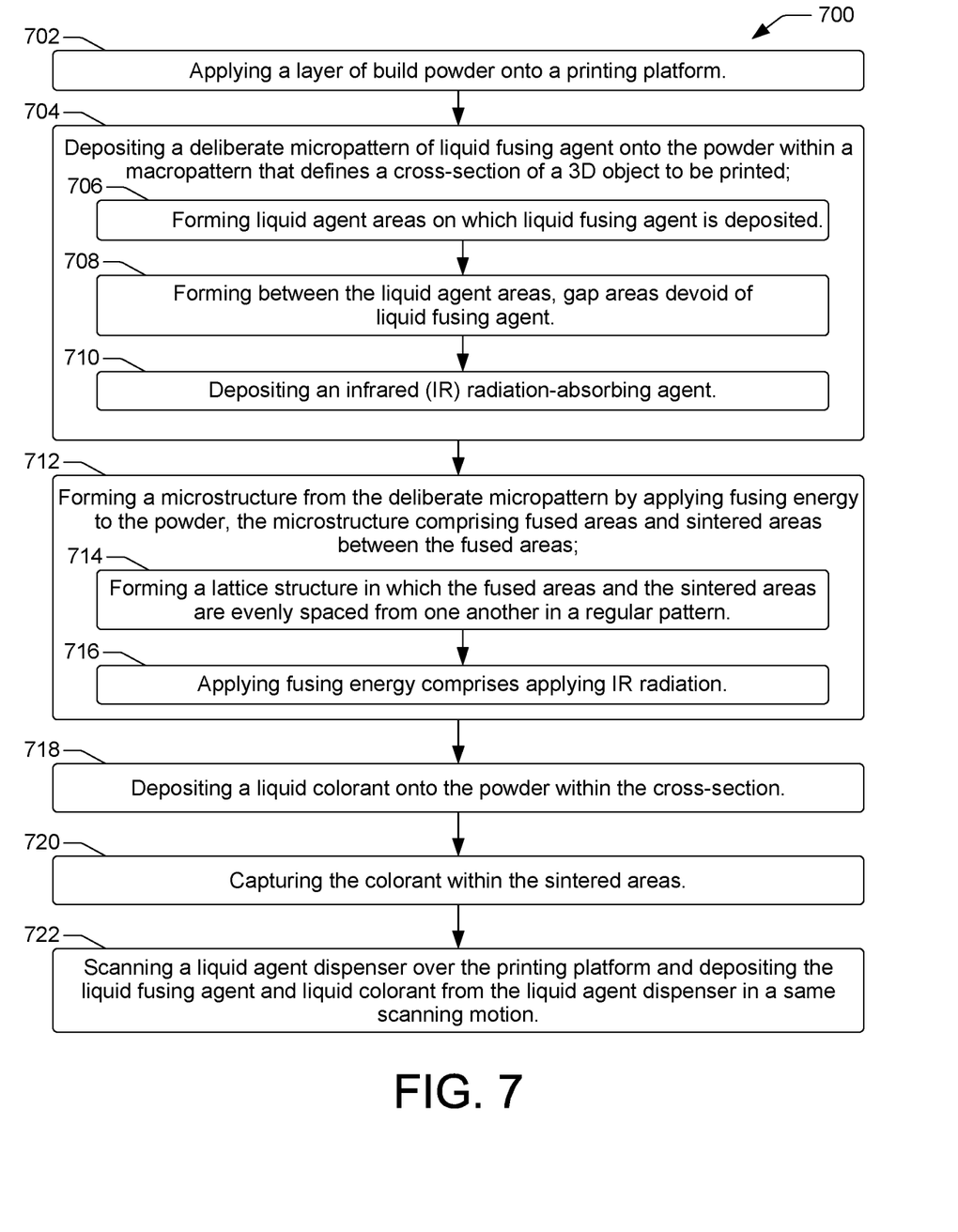

FIGS. 5, 6, and 7, are flow diagrams showing example methods 500, 600, and 700, of printing a three-dimensional (3D) object. Methods 500, 600, and 700 are associated with examples discussed above with regard to FIGS. 1-4, and details of the operations shown methods 500, 600, and 700 can be found in the related discussion of such examples. The operations of methods 500, 600, and 700 may be embodied as programming instructions stored on a non-transitory, machine-readable (e.g., computer/processor-readable) medium, such as memory 132 shown in FIG. 1. In some examples, implementing the operations of methods 500, 600, and 700 can be achieved by a processor, such as a processor 130 of FIG. 1, reading and executing the programming instructions stored in a memory 132. In some examples, implementing the operations of methods 500, 600, and 700 can be achieved using an ASIC and/or other hardware components alone or in combination with programming instructions executable by a processor 130.

The methods 500, 600, and 700 may include more than one implementation, and different implementations of methods 500, 600, and 700 may not employ every operation presented in the respective flow diagrams of FIGS. 5, 6, and 7. Therefore, while the operations of methods 500, 600, and 700 are presented in a particular order within their respective flow diagrams, the order of their presentations is not intended to be a limitation as to the order in which the operations may actually be implemented, or as to whether all of the operations may be implemented. For example, one implementation of method 500 might be achieved through the performance of a number of initial operations, without performing one or more subsequent operations, while another implementation of method 500 might be achieved through the performance of all of the operations.

Referring now to the flow diagram of FIG. 5, an example method 500 of printing a three-dimensional (3D) object begins with receiving object data that represents a model of a 3D object, as shown at block 502. As shown at block 504, the method includes modifying the object data to generate patterned object data. Modifying the object data can include integrating a deliberate micropattern with the object data. As shown at block 506, from the patterned object data, print data is generated to control a 3D printer to deposit a deliberate micropattern of liquid fusing agent onto a layer of build material within a macropattern that comprises a cross-section of a 3D object being printed. The deliberate micropattern comprises agent areas that have liquid fusing agent and gap areas that lack liquid fusing agent. As shown at block 508, in some examples depositing a deliberate micropattern comprises depositing an infrared (IR) radiation-absorbing fusing agent. Depositing a deliberate micropattern can also include depositing multiple different micropatterns onto the layer of build material at different areas within the macropattern, as shown at block 510. Applying fusing energy includes applying IR radiation to cause the fusing agent to heat build material according to the deliberate micropattern while not heating the liquid colorant, as shown at block 512.

As shown at block 514, the method 500 includes forming a deliberate microstructure that corresponds with the deliberate micropattern by applying fusing energy in order to simultaneously fuse the agent areas while sintering the gap areas. In different examples, forming a deliberate microstructure on a layer of the 3D object can include forming the microstructure on a surface layer of the 3D object, an inner layer of the 3D object, and/or combinations thereof. The method further includes depositing a liquid colorant onto the layer of build material within the macropattern, as shown at block 516. As shown at block 518, the liquid colorant can be captured within the gap areas when forming the microstructure.

Referring now to FIG. 6, another example method 600 of printing a three-dimensional (3D) object begins at block 602 with depositing a powder layer onto a printing platform. As shown at block 604, the method includes forming on the powder layer, a deliberate micropattern comprising fusible areas on which fusing agent is deposited, separated by sinterable areas in between the fusible areas on which fusing agent is not deposited. The powder layer can then be exposed to infrared radiation to simultaneously fuse the fusible areas and sinter the sinterable areas into a deliberate microstructure that corresponds with the deliberate micropattern, as shown at block 606. The method also includes depositing a colorant while depositing the fusing agent, and capturing the colorant within the sinterable areas, as shown at blocks 608 and 610, respectively.

Referring to FIG. 7, another example method 700 of printing a three-dimensional (3D) object begins at block 702 with applying a layer of build powder onto a printing platform. As shown at block 704, the method includes depositing a deliberate micropattern of liquid fusing agent onto the powder within a macropattern that defines a cross-section of a 3D object to be printed. Depositing the liquid fusing agent includes forming liquid fusing agent areas on which liquid fusing agent is deposited, and forming between the liquid fusing agent areas, gap areas devoid of liquid fusing agent, as shown at blocks 706 and 708, respectively. Depositing the liquid fusing agent can also include depositing an infrared (IR) radiation-absorbing agent, as shown at block 710.

The method 700 can continue as shown at block 712, with forming a deliberate microstructure from the deliberate micropattern by applying fusing energy to the powder. The microstructure comprises fused areas and sintered areas between the fused areas. Forming the microstructure can include forming a lattice structure in which the fused areas and the sintered areas are evenly spaced from one another in a regular pattern, as shown at block 714. As shown at block 716, applying fusing energy can comprise applying IR radiation.

The method 700 can continue as shown at block 718, with depositing a liquid colorant onto the powder within the cross-section, and with capturing the colorant within the sintered areas as shown at block 720. As shown at block 722, depositing the liquid fusing agent and liquid colorant can include scanning a liquid agent dispenser over the printing platform and depositing the liquid fusing agent and liquid colorant from the liquid agent dispenser in a same scanning motion.

What is claimed is:

1. A method of printing a three-dimensional (3D) object comprising:
   receiving object data that represents a model of a 3D object;
   modifying the object data to generate patterned object data;
   from the patterned object data, generating print data to control a 3D printer to deposit a deliberate micropattern of liquid fusing agent onto a layer of build material within a macropattern that comprises a cross-section of a 3D object being printed, the deliberate micropattern comprising agent areas that have liquid fusing agent and gap areas that lack liquid fusing agent; and,
   forming a deliberate microstructure that corresponds with the deliberate micropattern by applying fusing energy to simultaneously fully melt build material in the agent areas from heat generated in the agent areas by absorbing fusing energy with the fusing agent, while binding without fully melting, build material in the gap areas with indirect heat that disperses into the gap areas from the agent areas.

2. A method as in claim 1, wherein modifying the object data comprises integrating the deliberate micropattern with the object data.

3. A method as in claim 1, further comprising:
   depositing a liquid colorant onto the layer of build material within the macropattern; and,
   capturing the liquid colorant within the gap areas when forming the microstructure.

4. A method as in claim 3, wherein:
   depositing a deliberate micropattern of liquid fusing agent comprises depositing an infrared (IR) radiation-absorbing fusing agent; and,
   applying fusing energy comprises applying IR radiation to heat build material according to the deliberate micropattern while not heating the liquid colorant.

5. A method as in claim 1, wherein depositing a deliberate micropattern comprises depositing multiple different micropatterns onto the layer of build material at different areas within the macropattern.

6. A method as in claim 1, wherein forming a microstructure comprises forming a microstructure on a layer of the 3D object selected from the group consisting of a surface layer of the 3D object, an inner layer of the 3D object, and combinations thereof.

7. A non-transitory machine-readable storage medium storing instructions that when executed by a processor of a three-dimensional (3D) printer cause the 3D printer to:
 deposit a powder layer onto a printing platform;
 form on the powder layer, a deliberate micropattern comprising fusible areas on which fusing agent is deposited separated by sinterable areas in between the fusible areas on which fusing agent is not deposited; and,
 expose the powder layer to infrared radiation to simultaneously fully melt powder in the fusible areas with heat generated by the fusing agent absorbing infrared radiation and bind powder without fully melting powder in the sinterable areas into a microstructure with indirect heat that disperses into the sinterable areas from the fusible areas.

8. A storage medium as in claim 7, wherein forming a deliberate micropattern comprises depositing fusing agent, the instructions further causing the 3D printer to deposit a colorant while depositing the fusing agent.

9. A storage medium as in claim 8, wherein exposing the powder layer to infrared radiation comprises capturing the colorant within the sinterable areas.

10. A method of printing a three-dimensional (3D) object comprising:
 applying a layer of build powder onto a printing platform;
 depositing a deliberate micropattern of liquid fusing agent onto the powder within a macropattern that defines a cross-section of a 3D object to be printed; and,
 forming simultaneously, sintered areas and fused areas of a microstructure from the deliberate micropattern by applying fusing energy to the powder, the microstructure comprising fused areas of the powder that are solidified after fully melting from heat generated by the absorption of fusing energy by the fusing agent and sintered areas of the powder between the fused areas that are bound together without fully melting from indirect heat that disperses into the sintered areas from the fused areas.

11. A method as in claim 10, wherein depositing a deliberate micropattern of liquid agent comprises:
 forming liquid agent areas on which liquid fusing agent is deposited; and,
 forming in between the liquid agent areas, gap areas that are devoid of liquid fusing agent.

12. A method as in claim 11, wherein:
 depositing liquid fusing agent comprises depositing an infrared (IR) radiation-absorbing agent; and,
 applying fusing energy comprises applying IR radiation.

13. A method as in claim 10, further comprising:
 depositing a liquid colorant onto the powder within the cross-section; and,
 capturing the colorant within the sintered areas.

14. A method as in claim 13, wherein depositing liquid fusing agent and liquid colorant comprises scanning a liquid agent dispenser over the printing platform and depositing the liquid fusing agent and liquid colorant from the liquid agent dispenser in a same scanning motion.

15. A method as in claim 10, wherein forming a microstructure comprises forming a lattice structure in which the fused areas and the sintered areas are evenly spaced from one another in a regular pattern.

* * * * *